United States Patent [19]
Gavnoudias

[11] Patent Number: 5,617,097
[45] Date of Patent: Apr. 1, 1997

[54] LOW-COST NEAR-SURFACE BURST (NSB) CAPABILITY FOR PROXIMITY FUZES

[75] Inventor: Stratis Gavnoudias, Laurel, Md.

[73] Assignee: The United States of America as represented by the Secretary of the Army, Washington, D.C.

[21] Appl. No.: 390,457

[22] Filed: Feb. 16, 1995

[51] Int. Cl.⁶ .................................................. F42C 13/04
[52] U.S. Cl. ............................................. 342/68; 102/214
[58] Field of Search ................................ 342/68, 85, 99, 342/166; 102/214

[56] References Cited

U.S. PATENT DOCUMENTS

| | | | |
|---|---|---|---|
| 4,036,142 | 7/1977 | Williams | 102/201 |
| 4,782,757 | 11/1988 | Carter | 102/394 |
| 5,525,975 | 6/1996 | Walker et al. | 340/870.01 |
| 5,539,410 | 7/1996 | Zveglich | 342/68 |

*Primary Examiner*—John B. Sotomayor
*Attorney, Agent, or Firm*—Saul Elbaum; Edward Goldberg; Michael C. Sachs

[57] ABSTRACT

System and modifications are presented which allow existing artillery and mortar projectile proximity fuzes to have a near-surface burst (NSB) option enabling low height of bursts ranging between one and three meters. The additional circuitry needed to implement this NSB into an existing fuze is a single operational amplifier. The velocity of the fuze is calculated by the micro-controller counting the number of Doppler cycles over a pre-determined sample period of time. Thereafter, using the fuze velocity, the delay time needed for a NSB detonation is computed.

13 Claims, 7 Drawing Sheets

LOW-COST NEAR-SURFACE BURST (NSB) CAPABILITY FOR PROXIMITY FUZES

The invention described herein may be manufactured, used and licensed by or for the Government for Government purposes.

BACKGROUND OF THE INVENTION

1. Field of Invention

This invention relates to techniques for providing a near surface burst function for artillery proximity fuzes by adding a feature to the existing multi-option fuze for artillery (MOFA) hardware.

2. Background of the Invention

The current multi-option fuze for the artillery does not have a near surface function. Rather, the current multi-option fuze for artillery (MOFA) is designed to operate in four functional modes: Proximity, Time, Impact, and Delay. In the PD, or Point Detonate Mode, the detonation occurs upon impact with the target. The PD mode acts as a back-up mode in the case of any failures in the other modes. In the Delay mode, detonation occurs with a slight delay after impact. This mode is beneficial for the penetration of certain structures. The third mode, Time mode, detonates after a set time predetermined by the setter of the fuze. This mode is useful with smoke or illumination rounds. For the multi-option fuze for artillery in the Proximity mode, detonation occurs at a nominal height of nine meters above the ground. There exists a need to provide a near surface burst function to be added to the existing proximity sensor of the fuze which could provide low height-of-bursts ranging between one and three meters above the ground.

SUMMARY OF INVENTION

It is an object of this invention to provide an added feature to the existing PROX Sensor of the Multi-Option Fuze for Artillery for near surface bursts 1–3 meters above the ground instead of nine (9) meters.

It is still a further object of this invention to provide a fuze option to the existing fuze which achieves low height of bursts ranging between one and three meters.

It is a further object of this invention to describe the additional circuitry required to implement this near-surface burst capability into the existing multi-option fuze for the Artillery.

It is finally an object of this invention to provide a near surface burst feature at low cost to any fuze program that incorporates a micro-processor board proximity function which extracts the Doppler signature for processing by adapting their sensor design.

The low cost of this invention is due to the low part count and ease in adapting the proximity sensor designs to have a near-surface burst option capability.

BRIEF DESCRIPTION OF THE DRAWINGS

FIG. 6. Laboratory results (a) Prox mode (b) NSB mode.

DETAILED DESCRIPTION OF THE PREFERRED EMBODIMENT

Figure 1:
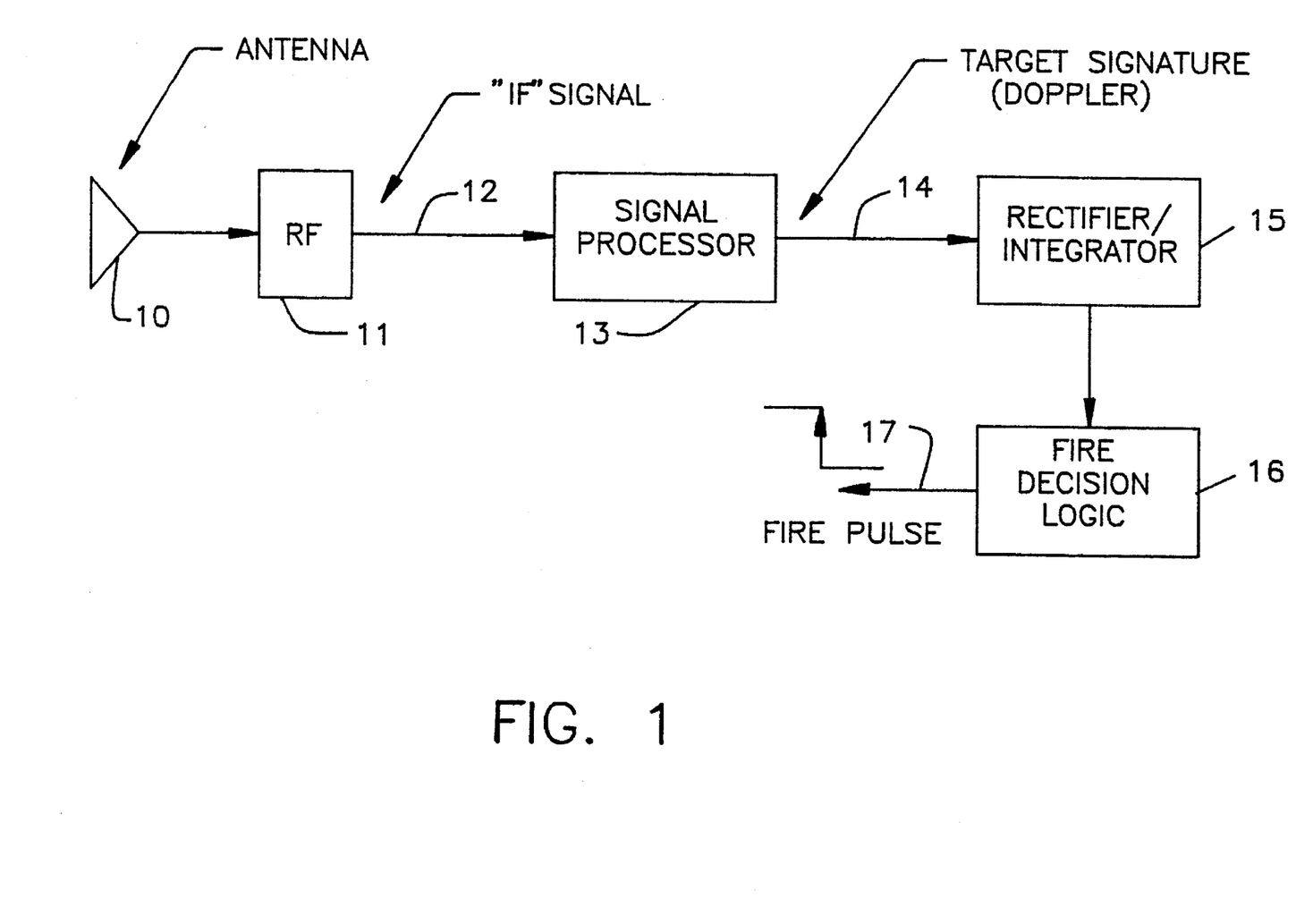
FIG. 1. Block diagram of the proximity function theory.

FIG. 1 is a block diagram which depicts the proximity fuze's theory of functioning. In particular, when the MOFA sensor turns on several seconds before a preset target time, the fuze begins to transmit a frequency modulated RF signal. The receiver 11 in the fuze picks up Doppler-shifted signal reflected from the target. The frequency difference between the transmitted signal and the received signal is extracted for further processing and is known as the "IF" signal 12.

Figure 2:
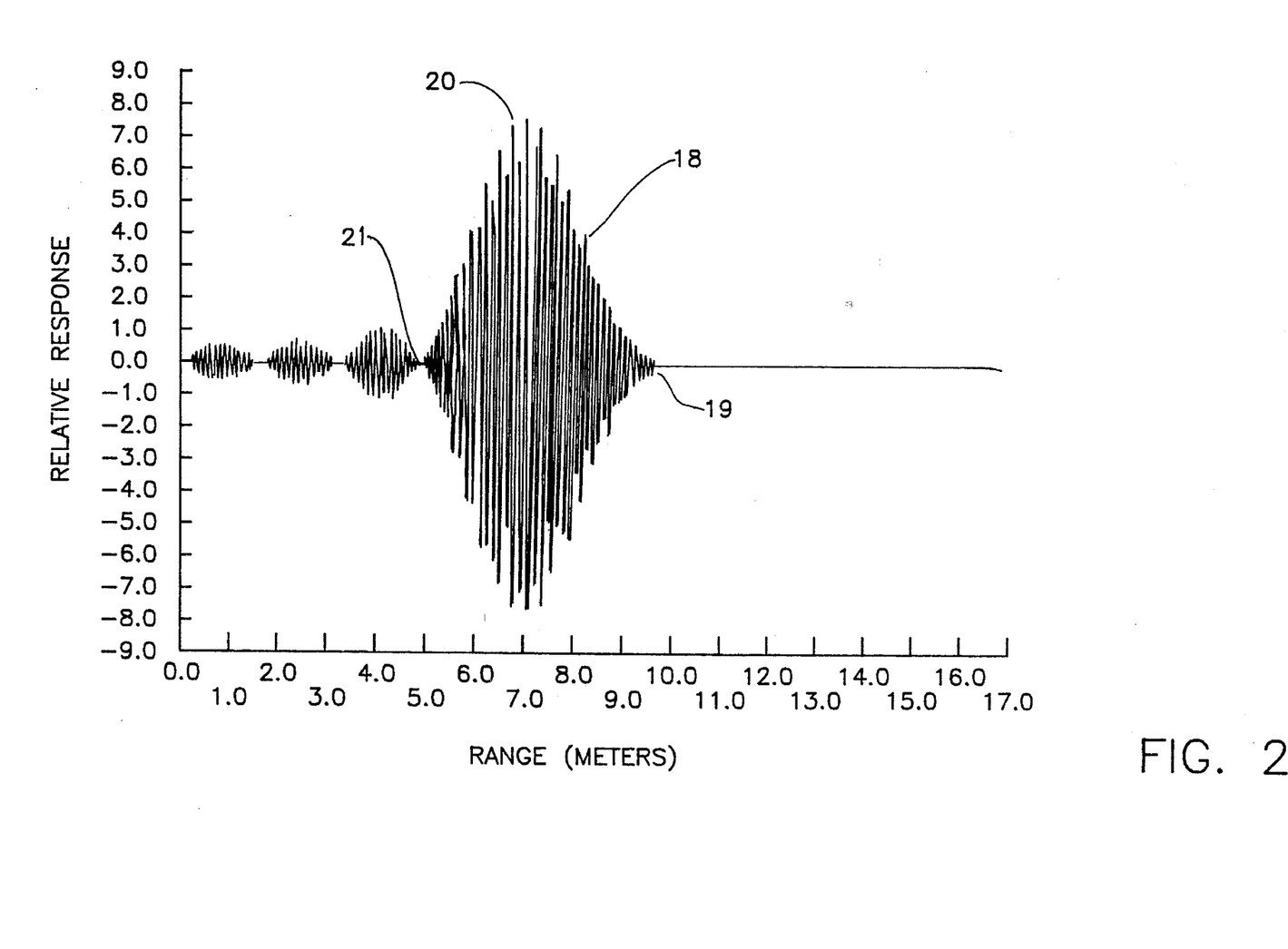
FIG. 2. Computer generated Doppler range response.

The IF signal 12 is then processed through the signal processor 13 which generates a Doppler range response 14 as shown at FIG. 2. The horizontal scale represents the distance of the fuze from the target in meters. As the fuze approaches the ground, there is little response above nine meters because the Doppler signal is not within the range cell window. The Doppler range cell window for this particular simulated fuze starts at ten meters and ends at five meters. This signal is rectified, integrated, 15 and then fed into a voltage comparator which comprises the fire-decision logic circuitry 16 to determine the proper instant to detonate the fuze. When the signal 17 exceeds the voltage threshold (to fire the fuze), the output comparator signal goes High (transition from a LOW to a HIGH state), which then triggers detonation of the fuze. The system is designed so at nine meters the Doppler signal will exceed the voltage threshold and thus produce a nine meter height of burst (HOB).

The NSB functional mode now takes the basic design described above and operates the fuze in its normal Proximity mode, with the range cell peak at seven meters. Once the fuze senses a normal proximity function, instead of detonating, the fuze introduces a processed time delay. Thus, the near-surface burst function will occur some time after the fuze reaches nine meters.

The following equations describe the theory in producing a Near-Surface Burst (NSB) by using a time delay after nine meters has been reached: Once the fuze reaches nine meters, the Doppler frequency is derived from:

$$Fd = N/dt \tag{1}$$

which counts the number of Doppler cycles (N) within a sample time (dt). Knowing the Doppler Frequency, Fd, the approach fuze velocity of the projectile is calculated by:

$$V = (Fd \times c)/2 \times Fo \tag{2}$$

wherein the approach velocity is the Doppler frequency, Fd, multiplied by the speed of light, c, and divided by two times the RF frequency, Fo. Now knowing the velocity of the projectile, the appropriate time delay required for the fuze to reach the desired NSB height can be determined by:

$$Td = (2*Fo*D)/(Fd*c) \tag{3}$$

Where, Fo is the transmitted FM frequency in hertz; Fd is the Doppler frequency; c is the speed of light; D is the desired distance from nine meters to the near-surface burst function height; N is the number of Doppler cycles counted within a pre-determined sample time; and dt is the pre-determined sample time length.

Figure 3:
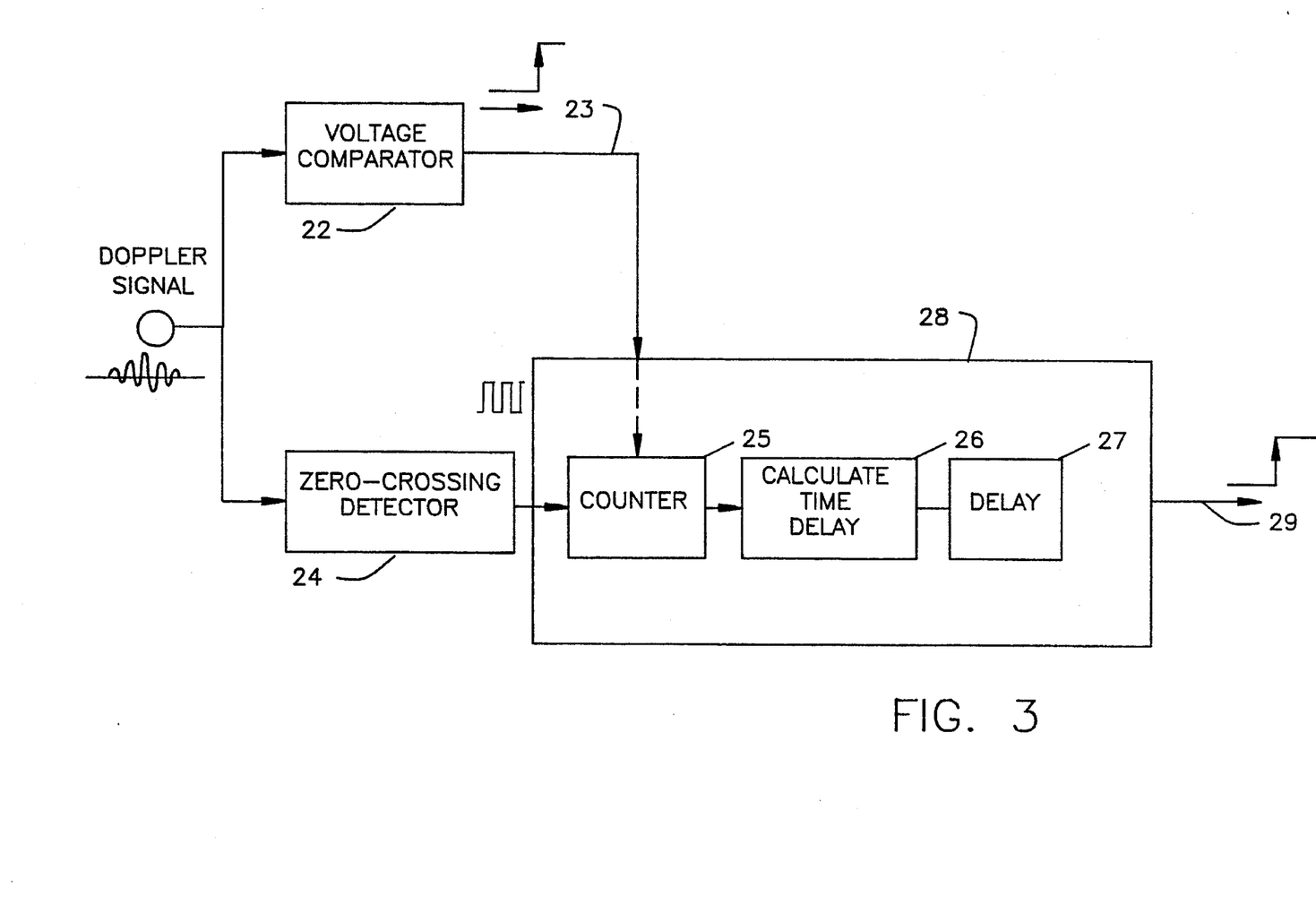
FIG. 3. Near-Surface burst (NSB) block diagram.

FIG. 3 describes the block diagram of the near surface burst functional mode. The voltage comparator 22 output transitions high when the rectified Doppler signal output 23 from the rectifier integrator 15 reaches the set voltage threshold.

This transition is recognized by a micro-controller 28 as a nine meter proximity function. If this were in the Proximity mode, the fuze would detonate. But in the near surface burst mode, the output 23 of the comparator 22 enables a micro-controller 28 NSB routine. The existing MOFA micro-controller 28 performs many functions. It accepts inputs, makes decisions based on these inputs, and executes appropriate output signals. With the added NSB feature, the micro-controller 28 will have a few extra responsibilities. Concurrently, the Doppler signal is passed to an op-amp which functions as a zero-crossing detector 24 to square up the signal. This signal is then fed into the micro-controller 28 to calculate the Doppler frequency and to calculate the proper delay 26 needed for a near-surface burst.

The voltage comparator 22 and the micro-controller 28 are existing parts of the MOFA hardware. With only the addition of the zero-crossing detector required, the design becomes valuable because it is very inexpensive and does not require any hardware changes to the existing MOFA fuze.

Figure 4:
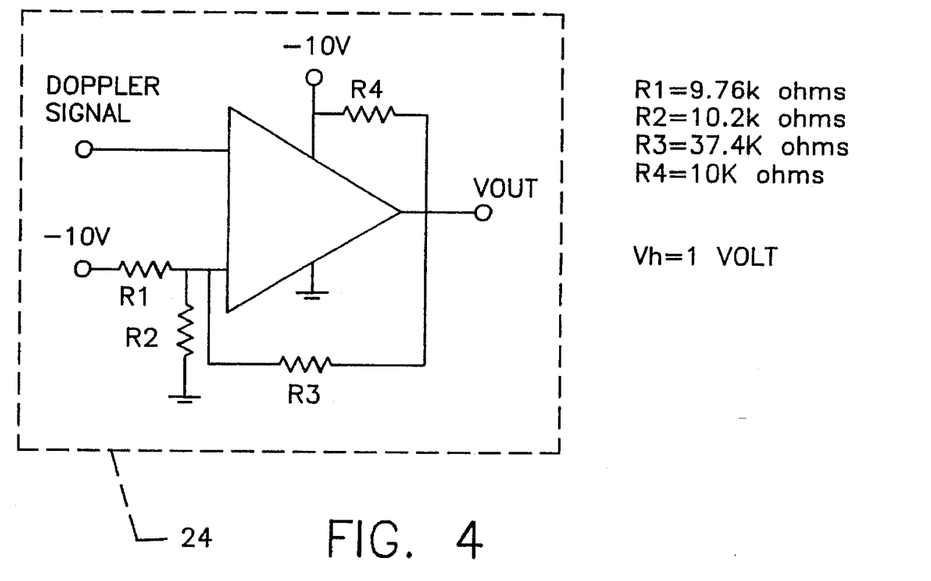
FIG. 4. Circuit diagram of zero-crossing detector.

FIG. 4 depicts the circuitry of the zero-crossing detector 24. This zero-crossing detector 24, has two specific functions. One is to condition the Doppler signal. The Doppler signal rides on a five volt D.C. level and its peak-to-peak voltage can reach up to ten volts. Since the micro-controller 28 cannot accept inputs above five volts, the zero-crossing detector 24 limits the signal to five volts zero-to-peak and converts the Doppler signal to a square wave to make it manageable for the micro-controller 28 to process.

This hard-limited waveform, as the original Doppler signal is altered in magnitude, but contains the same frequency content. To calculate the fuze velocity, only the Doppler Frequency is needed. Hence, alteration of the signal magnitude has no detrimental consequence.

The second function of the zero-crossing detector 24 is to reject any noise. This is accomplished by providing a one volt hysteresis.

Any Doppler signal that does not exceed this one volt hysteresis level will be considered noise and not recognized by the micro-controller 28 as Doppler.

Figure 5:
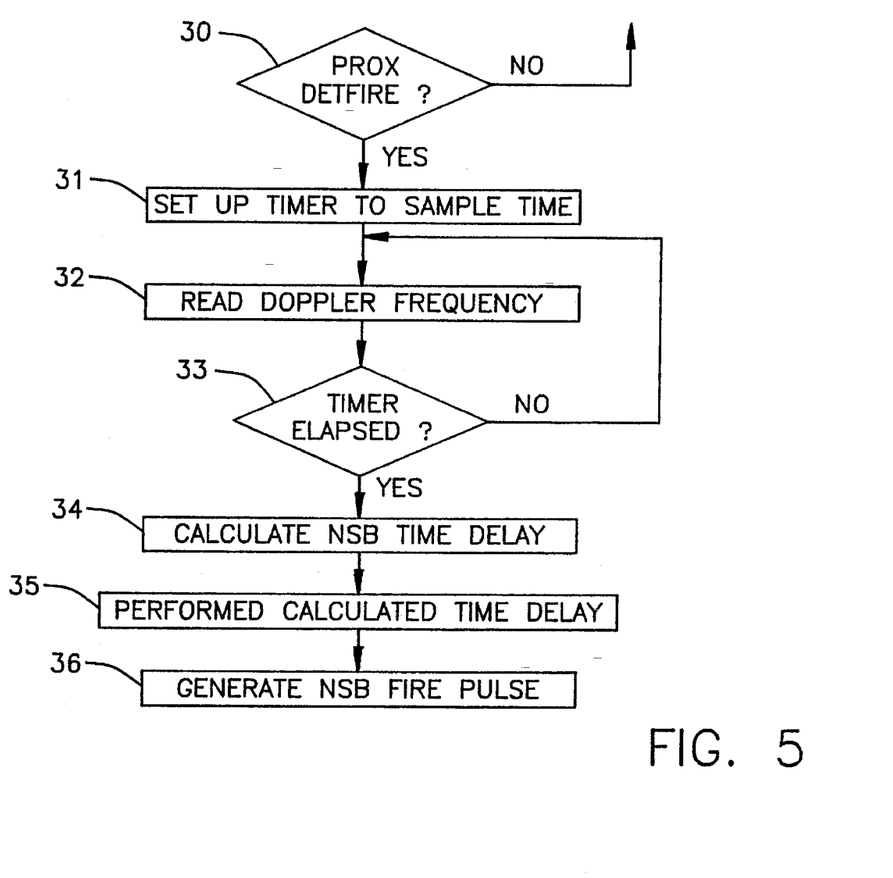
FIG. 5. Flow chart of near surface burst (NSB) sequence.

FIG. 5 depicts the NSB subroutine of the micro-controller 28. When the fuze senses a nine meter HOB, the output of the voltage comparator 22 transitions HIGH. The transition is recognized by the micro-controller 28 to branch to the NSB subroutine described at FIG. 5.

First, the micro-computer 28 sets a timer 31 to a predetermined sample time to count Doppler cycles 32. The Doppler count is accomplished by incrementing a counter 32 for every high transition of the Doppler signal. In the interim, the counter 32 continuously checks 33 to see if the timer 31 has elapsed. If not, it continues to count Doppler cycles 32.

Once completed, the micro-controller 28 calculates the Doppler frequency (samples/second) 32 by dividing the number of cycles counted, N, by the sample timer (dt) 31 using formula (1). The next step is to calculate the time delay 34 needed for, e.g., a two meter HOB. This is computed by the time delay formula (3). Finally, with the timer delay calculated 34, the subroutine performs the calculated timer delay 35 to reach the desired two meter height and executes a DETFIRE signal 36 for detonation of the fuze. The micro-controller is the MC68HC705C8 or equivalent.

Figure 6A:
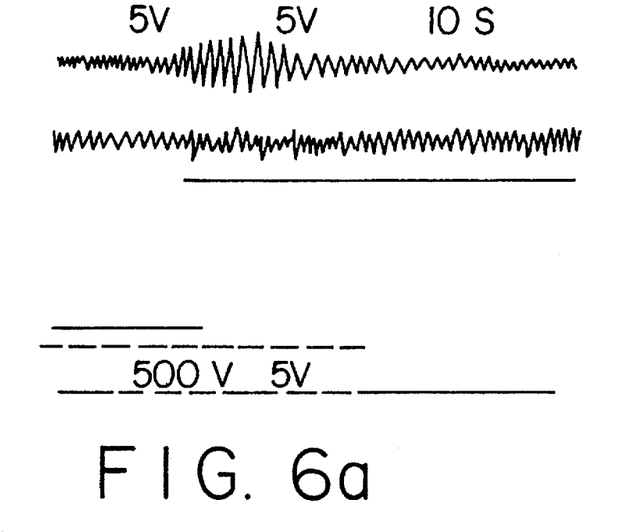
Figure 6B:
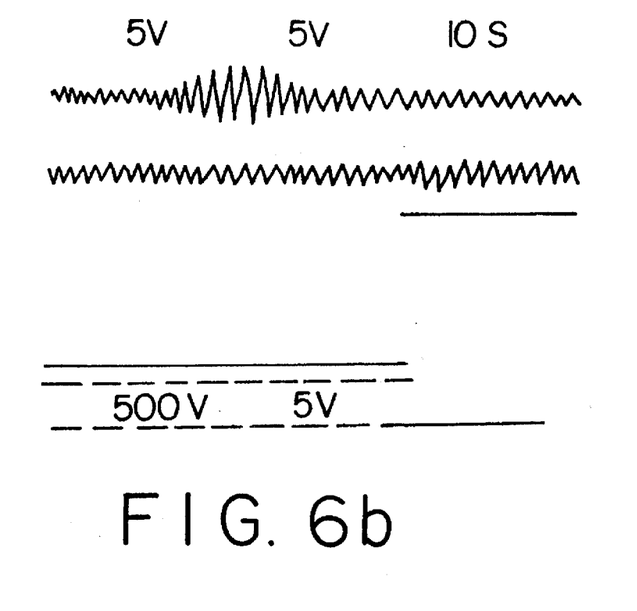

FIG. 6 shows two oscilloscope traces taken during laboratory testing using an RF simulation chamber. FIG. 6(a) represents a proximity function and FIG. 6(b) an NSB function. The top channel of both traces represents the Doppler range response. The second channel (where the signal transitions from a LOW to a HIGH state) represents the DETFIRE signal which initiates the detonator. In the proximity mode, when the voltage threshold of the comparator is reached, the DETFIRE signal goes HIGH, and initiates the round at nine meters. In the NSB mode, notice the time delay between the nine meter PROX DETFIRE signal (FIG. 6(a)) and the two meter NSB DETFIRE signal (FIG. 6(b)). This is the time delay calculated by the microprocessor 28.

Field tests were conducted on four mortar rounds set to the NSB functional mode. Two rounds functioned properly and produced a near-surface burst of one meter. The other two rounds functioned point detonation (PD) backup due to drop outs in the doppler range response.

Figure 7:
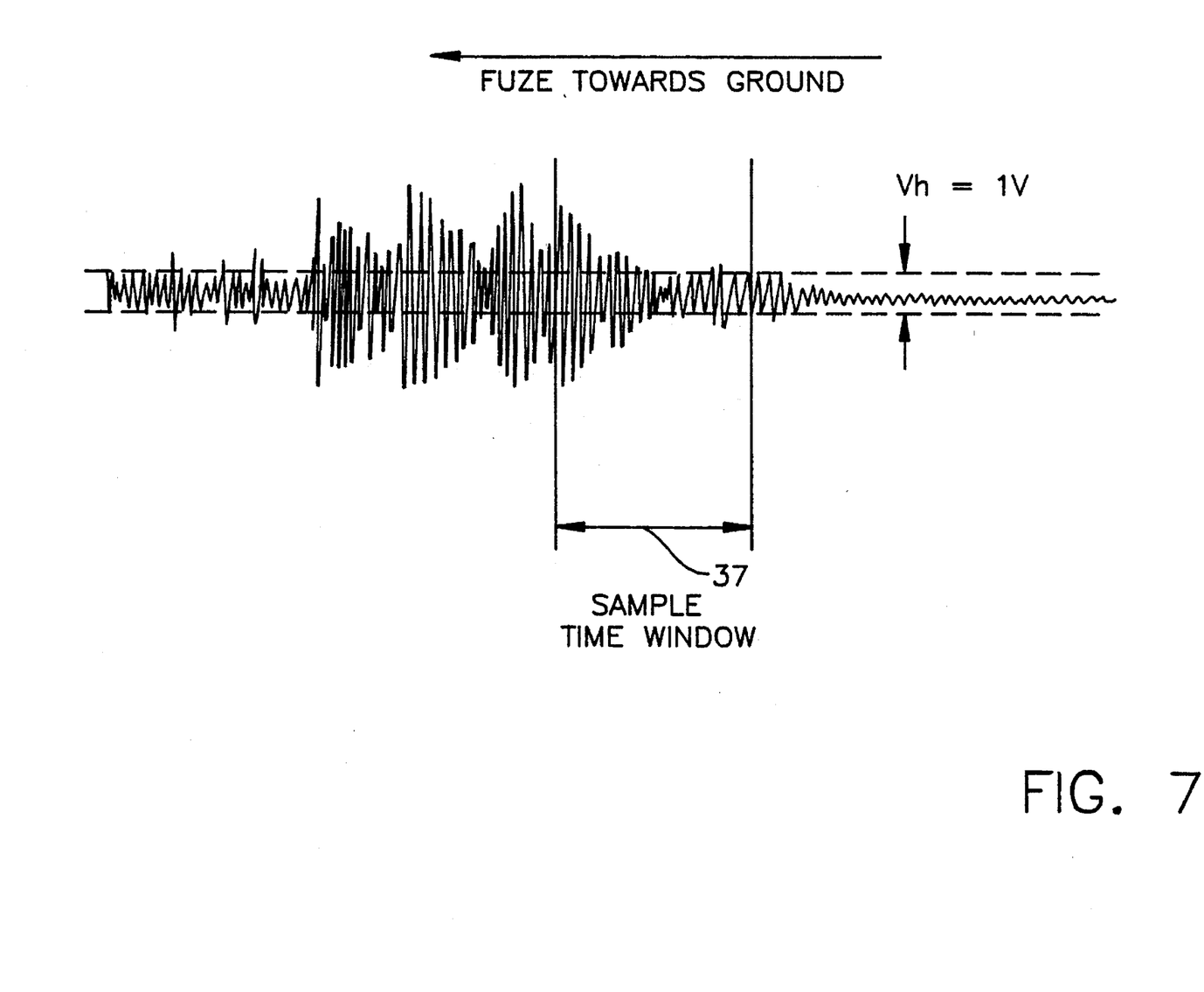
FIG. 7. Shows range law response from failed NSB unit.

FIG. 7 depicts the range response retrieved from an artillery projectile whose fuze failed to activate the Near-Surface Burst (NSB) routine. The horizontal line represents the one volt hysteresis level, Vh, provided by the zero-crossing detector 24 op-amp. The Doppler signal that does not exceed this one-volt hysteresis level will be considered to be noise and will not be recognized by the micro-controller 28 as Doppler.

The drop outs in the range law response, known as the coke-bottling effects, are due to multi-path return signals reflected back to the receiver 13 of the fuze. Some of these returned signals act destructively with one another and cancel each other out. Therefore, when the micro-controller tried to determine the Doppler frequency by counting Doppler cycles, it missed a few cycles due to the coke-bottling effect and predicted that the fuze was traveling at a slower rate then it actually was. This in turn generated a larger time delay than required for the fuze to read the Near Surface Burst height. This caused the fuze to function PD backup before the micro-controller 28 finished its delay loop.

To overcome this problem, it was determined that instead of determining the time delay required for the fuze to reach the desired NSB function height using a single sample time window 37 to count Doppler cycles, one could break up the window 37 into three smaller frames. Each frame would be of length equal to one third of the original sample time window 37. Therefore, the micro-computer 28 can calculate the Doppler frequency within each frame.

Thus, an accurate frequency can be determined by discarding any erroneous data given by a particular frame, and averaging the valid ones, which in turn, will produce an accurate time delay.

For example, one approach would be to make sure there are at least two accurate Doppler frequency measurements taken. The time delay can then be computed by using the average of these two Doppler frequency measurements. If by chance there are not two valid frames to compute the Doppler frequency, the fuze can revert to detonate instantly. This detonation would occur at a function height somewhere between the nine meter PROX height and the near-surface burst (NSB) height which is a favorable alternative, rather than function PD back-up.

Figure 8:
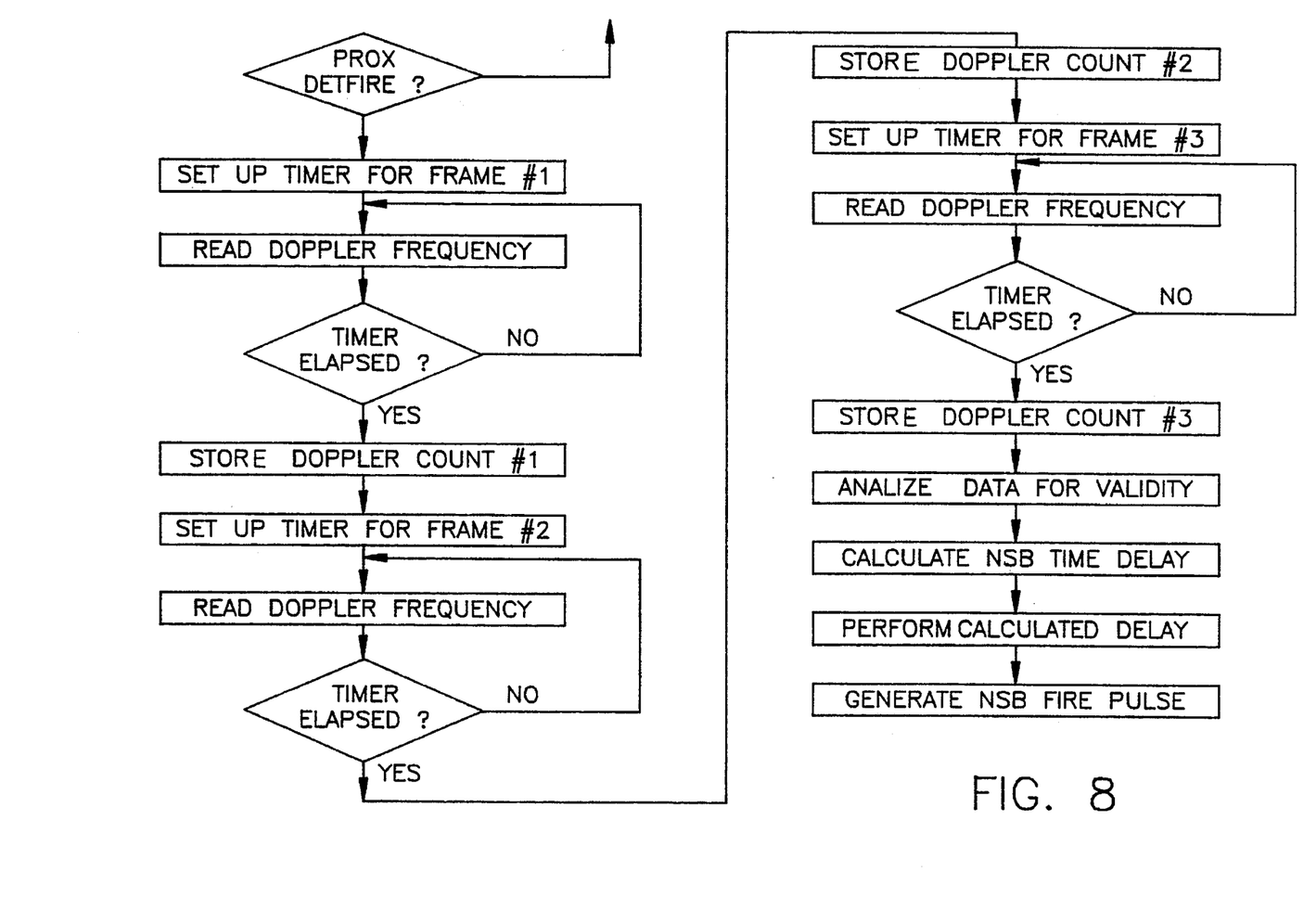
FIG. 8. Flow chart of alternate near-surface burst sequence.

The NSB subroutine described herein is called only when the fuze is detected to be at the proper function height of nine meters. Therefore, there must be Doppler present at the output of the Doppler filters. Using the fact that there is some prior knowledge of the Doppler signal because one knows what the Doppler frequency should be within certain thresholds, it can be determined by the micro-controller 28, that the calculated Doppler frequency, for a particular frame, is not within the theoretical Doppler thresholds, and hence to consider the calculated Doppler frequency erroneous. FIG. 8 illustrates the subroutine's flow chart which is self-explanatory for this alternate NSB algorithm.

Thus, it is apparent that in accordance with the present invention, a functional design that fully resolves an important military munitions problem is set forth above. While the invention has been described in conjunction with a specific embodiment and one related alternative, it is evident that many alterations, modifications, and variations will be apparent to those skilled in the art in light of the foregoing descriptions. Accordingly, it is intended that the present invention embrace all such alternatives, modifications, and variations as fall within the spirit and broad scope of the appended claims.

What is claimed is:

1. A process for providing a near surface burst capability to the existing option fuze for artillery wherein said option fuze is modified with the addition of a zero-crossing detector to square up the signal and a subroutine to the existing micro-controller so that height of bursts can be calculated to occur one to three meters from the ground.

2. A process as in claim 1 wherein the said zero-crossing detector is an operational amplifier.

3. A process as in claim 1 wherein said added subroutine to the existing micro-controller counts Doppler cycles, calculates Doppler frequency, calculates time delay needed to reach NSB function height, performs a delay loop, and triggers detonation of the said fuze.

4. A system modification to a multi-option fuze for artillery to provide a near-surface burst capability using the Doppler-shifted signal reflected from the target comprising means for the said fuze to sense a proximity function to introduce a processed delay time by enabling a micro-controller near-surface burst subroutine means to condition said Doppler signal and to reject noise.

5. A system modification as claimed in claim 4 wherein the voltage comparator comprises the means for the said fuze to sense a normal proximity function to introduce a processed delay time by enabling a micro-controller near-surface burst subroutine.

6. A system modification as in claim 4 wherein the means to condition said Doppler Signal and to reject noise comprises a zero-crossing detector.

7. A system modification as in claim 6 wherein the said Doppler signal is conditioned by the said zero-crossing detector which limits the signal to five volts zero-to-peak and converts said Doppler signal to a square wave.

8. A system modification as in claim 6 wherein the means to reject said noise by said zero-crossing detector is accomplished by providing a one volt hysteresis causing a Doppler signal less than one volt by hysteresis level to be considered noise.

9. A system modification as in claim 4 wherein said micro-controller near-surface burst subroutine counts Doppler cycles, calculates Doppler frequency, calculates time delay needed to reach NSB function height, performs a delay loop, and triggers detonation of said fuze.

10. A method of providing a NSB functional mode to a fuze wherein the fuze is operated in its normal proximity mode with a range cell peak at approximately seven meters at which time upon sensing the normal proximity function instead of detonating, the fuze introduces a processed time delay causing said NSB function mode to occur some time after the fuze reaches nine meters.

11. A method as in claim 10 wherein the processed time delay is calculated with the use of a micro-controller in accordance with the following formulae:

$$Fd = N/dt \tag{1}$$

$$V = (Fd \times c)/2 \times Fo \tag{2}$$

$$Td = 2 \times Fo \times D/(Fd \times c) \tag{3}$$

where Fd is the Doppler Frequency, V is the fuze approach velocity, Fo is the transmitted frequency, c is the speed of light, D is the desired distance from nine meters to NSB function height, N is the number of Doppler cycles counted within a pre-determined sample time, dt is the pre-determined sample time length, and Td is the calculated time delay.

12. A method as is claim 11 wherein the Doppler frequency is computed by counting the number of Doppler cycles (N) within a sample time (dt).

13. A method as in claim 11 wherein said Doppler Frequency is computed by counting the number of Doppler cycles (N) within a sample time window broken up into three smaller frames allowing said micro-controller to calculate the Doppler frequency within each frame.

* * * * *